Jan. 2, 1968     A. G. CHYNOWETH     3,361,988
LASER MATRIX DEVICE
Filed Dec. 9, 1963

INVENTOR
A. G. CHYNOWETH
BY
*Sylvan Sherman*
ATTORNEY 3,361,988
LASER MATRIX DEVICE
Alan G. Chynoweth, Summit, N.J., assignor to Bell Telephone Laboratories, Incorporated, New York, N.Y., a corporation of New York
Filed Dec. 9, 1963, Ser. No. 329,050
5 Claims. (Cl. 331—94.5)

ABSTRACT OF THE DISCLOSURE

This application discloses an optical matrix device, useful as a two-dimensional display, which uses a plurality of injection lasers as pumping sources for controlling the lasing site in a member of laser material. More specifically, the laser matrix utilizes the directional property of the injection lasers to pump particular regions of the laser member. An array of injection lasers is uniformly distributed along each of a pair of adjacent surfaces of the member. The emission intensity of each injection laser is slightly less than that needed to cause lasing in the member. However, by energizing at least one injection laser in each array, a site in the laser member is defined in which lasing occurs. By selectively energizing pairs of injection lasers lasing can be induced at various selected points to form a desired pattern.

---

Figure 1:
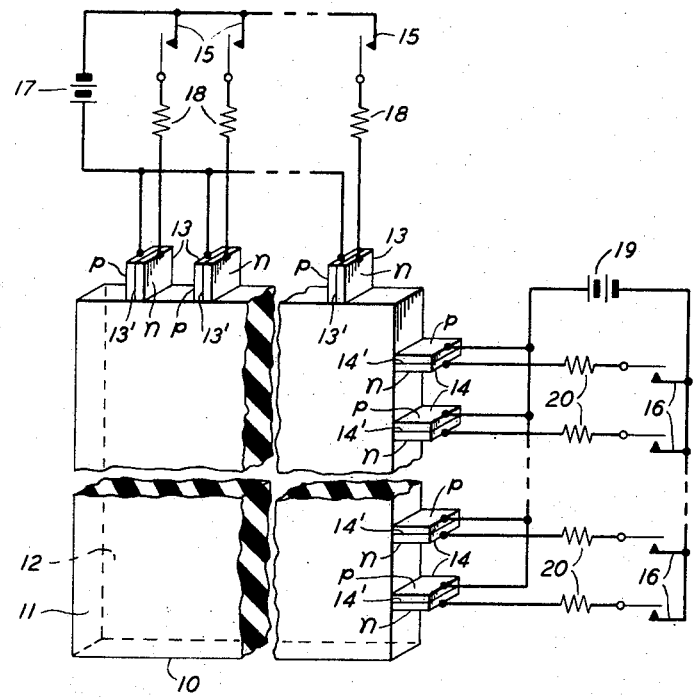

This invention relates to optical matrix devices which use a plurality of injection lasers as pumping sources for controlling the lasing site in a laser material.

Considerable interest has been shown recently in the class of devices known as display panels, and, in particular, in large, flat display panels capable of producing a fast-writing, bright display. At the same time, the proliferation of devices whose operation is based upon the rapid retrieval of stored information has given rise to the need for a simple, reliable, rapid readout device.

Basic to the operation of both the display device and the readout device is a scanning system. Because of the rapidity with which a light beam can be translated or deflected, it appears to be a most attractive scanning medium. In addition, the advent of the optical maser, or laser, has given a new dimension to optical scanning devices by making available a highly coherent and monochromatic source of light having a high intensity and narrow beam width.

It is, accordingly, the broad object of this invention to provide an optical scanning system.

It is a more specific object of this invention to utilize laser techniques and devices to control the location of an optical beam.

In accordance with the invention, discrete areas of laser material are separately pumped by individually controlled pumping sources. Each of the pumping sources provides pumping power that is less than required to induce laser action in the laser material. However, laser action is induced in a region of the laser material that is simultaneously pumped by two pumping sources. Thus, by selectively energizing appropriate pairs of pumping sources, the lasing site within the laser material can be determined. As the selected pairs of pumping sources is changed, the lasing site correspondingly changes.

In a specific illustrative embodiment of the invention, a rectangular parallelepiped member of laser material is pumped by means of a plurality of separately controlled injection lasers. The pumping lasers are arranged in a pair of transversely extending linear arrays along two adjacent surfaces of the laser member, the pair of arrays being orthogonally related. Each of the pumping lasers is transversely displaced from the next adjacent laser and extends longitudinally along the length of the laser member. Means are provided for energizing one, or more, of the pumping lasers along both sides of the laser member in any preselected sequence or combination.

The resulting device is a high speed, high intensity optical scanner such as might be used as the scanner for an optically scanned ferromagnetic memory device of the type described in United States Patent 3,319,235, issued to J. T. H. Chang and U. F. Gianola on May 9, 1967.

Since any desired pattern of lasing sites can be turned on, the device can also be used for display purposes. Alternatively, the device can be used to perform the "AND" logic function since an output is obtained only when at least two of the pumping sources (one on each adjacent surface of the laser member) are energized.

These and other objects and advantages, the nature of the present invention, and its various features, will appear more fully upon consideration of the illustrative embodiment now to be described in detail in connection with the accompanying drawings, in which:

FIG. 1 shows an illustrative embodiment of the invention; and

Figure 2:
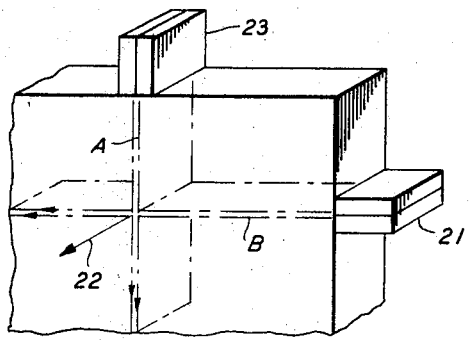

FIG. 2, given for purposes of explanation, illustrates the manner in which two pumping sources interact within the laser material to produce a lasing site.

Referring to FIG. 1, there is illustrated a matrix device in accordance with the invention. The device comprises a rectangular parallelepiped member 10 of laser material such as, for example, calcium tungstate-neodymium ($CaWO_4$:Nd), hereinafter to be referred to as a neodymium laser. It is understood, however, that other laser materials can be used and that the choice of material depends upon many factors such as the frequency of radiation desired and the frequency of the pumping sources available. The $Nd^{3+}$ ion fluoresces at about 8700 A. and, hence, is of interest in a device intended to operate in the near infrared portion of the frequency spectrum.

As is well known in the laser art, member 10 is confined within an optical cavity. To this end, member 10 is prepared to have the opposite large area surfaces 11 and 12 parallel and smooth. In addition, surface 12 is coated with a thin film of a suitable reflective material, such as aluminum, to make its reflectivity as high as possible, and end 11 is similarly coated with a thin film of reflective material although this latter film is designed to permit several percent transmission therethrough. Thus substantially all of the light emitted by the laser member 10 is emitted through surface 11. Alternatively, external reflecting elements can be used as disclosed in United States Patent 3,055,257, issued to G. D. Boyd, A. G. Fox and T. Li on Sept. 25, 1962.

In an article by Roger Newman, entitled "Excitation of the $Nd^{3+}$ Fluorescence in $CaWO_4$ by Recombination Radiation on GaAs" published in the Journal of Applied Physics, February 1963, page 437, it is disclosed that an electroluminescent GaAs p-n junction can be used as a pumping source for a neodymium laser.

In United States Patent 3,059,117, issued to W. S. Boyle, on Oct. 16, 1962, and in many subsequent publications, (see, for example, Applied Physics Letters 1, 62, 1962, by M. I. Nathan, W. P. Dumke, G. Burns, F. H. Dill, Jr., and J. Lasher; also see Physical Review Letters, Nov. 1, 1962, "Coherent Light Emission From GaAs Junctions," by R. N. Hall, G. E. Fenner, J. D. Kingsley, T. J. Soltys, and R. O. Carlson), it is disclosed that under appropriate conditions a p-n- junction diode can be made to emit coherent radiant energy by the injection of minority carriers across the p-n junction or by exposure of the diode to any incident ionizing energy capable of producing hole-electron pairs in the semiconductor, such as, for example, light, electron beams, or X-rays.

In accordance with the present invention, there are distributed along a pair of adjacent small area sides or edges of member 10, an array of coherent diode pumping sources. In the embodiment of FIG. 1, these pumping sources comprise a first plurality of individually controlled injection lasers 13, distributed along the horizontal transverse dimension of member 10, and a second plurality of individually controlled injection lasers 14, distributed along the vertical transverse dimension of member 10. Each of these pumping sources provides pumping power that is slightly less than that required to induce maser action in member 10. Alternatively, member 10 can be uniformly energized over its entire volume by means of an additional, constant pumping source (not shown) whose pumping power is less than that required to induce laser action. In this latter arrangement, the pumping energy provided by each of the pumping diodes can be correspondingly less.

As is pointed out in United States Patent 3,295,911, issued to A. Ashkin and M. Gershenzon on Jan. 3, 1967, it is a characteristic of an injection laser that the p-n junction acts as a dielectric waveguide which tends to confine a major porton of the light power produced by the diode within the junction region. As a consequence of this light trapping within the junction region, the emission from an injection laser tends to continue along the plane of the p-n junction. This directional property of the injection laser is utilized in the present invention to have each injection laser pump a particular strip of laser member 10. Accordingly, in FIG. 1, each of the injection lasers is oriented with its junction plane (13' or 14') perpendicular to the small area surface of laser member 10 contiguous thereto and parallel to the adjacent small area sides of member 10. So oriented, the light from each injection laser is emitted in a direction parallel to the plane of the emitting p-n junction and enters the laser member along a plane that is perpendicular to the contiguous surface and parallel to the adjacent surfaces. As a result, only a slab-like portion of member 10 extending vertically or horizontally, as the case may be, is pumped by any one injection laser. This is illustrated in FIG. 2 which shows laser member 10 and two pumping diodes 23 and 21. Diode 23 is one from array or group 13 and diode 21 is one from array or group 14. As illustrated in FIG. 2, emission from diode 23 is in a vertical plane A. Since, as was indicated hereinabove, the emission from any one diode is less than that required to induce maser action in member 10, none occurs, and no output is produced. However, when diode 21 is activated, a second, horizontal plane B of emission is produced. Along the region in which these planes intersect, there is produced a region in which the combined pumping power from diodes 23 and 21 is more than sufficient to induce laser action. Accordingly, there is produced a site of laser action in member 10 and a resulting output, as indicated by the arrow 22, in the direction normal to the large area surfaces of the member.

As is apparent, the site at which lasing occurs can be changed by energizing another diode within either group of diodes. Hence, by controlling the order in which the diodes are energized, an optical scanning device is obtained.

In the embodiment of FIG. 1, the circuit means for energizing the various diodes comprise a plurality of switches 15 for diodes 13 and a second plurality of switches 16 for diodes 14. One side of each diode in group 13 connects to one side of a source of direct current 17. The other side of each diode connects to the other side of source 17 through its individual switch and current limiting resistor 18.

Similarly, each diode in group 14 connects to a source of direct current 19, through its individual switch 16 and current limiting resistor 20.

Switches 15 and 16 can be either manually operated or, as is more likely, automatically operated by electronic switches.

While the dimension of member 10 between surfaces 11 and 12 can be as small as one to five millimeters, and the transverse dimensions of the order of one centimeter, larger matrices can also be devised. For such larger devices, the configuration of the injection lasers may, advantageously, be modified. In FIG. 1, each of the injection lasers 13 and 14 is shown as comprising a single, elongated diode extending the entire length of member 10. For longer rods, however, each of the pumping diodes can itself comprise a plurality of parallel connected individual diodes. These diodes can be constructed for maximum efficiency as described in the copending application of R. A. Furnanage and D. K. Wilson, Ser. No. 291,645, filed July 1, 1963, and assigned to applicant's assignee.

Alternatively, each of the pumping diodes can comprise a single, elongated crystal of one conductivity type on which there are formed a plurality of separate p-n junctions. These are then connected in parallel to the source of direct current and energized as a unit.

While the invention has been described using $CaWO_4$:Nd as the laser material and GaAs injection lasers, it is to be understood that the invention is not limited to these materials. Other laser materials and appropriate pumping sources can just as readily be used.

For large matrices or for materials having relatively large absorption losses, it may be found desirable to compensate for increasing absorption losses with increasing penetration into the laser member by the use of identical arrays of injection lasers, positioned on opposite edge surfaces. These oppositely located injection lasers are connected in parallel for simultaneous operation. As a consequence two coincident beams originating at opposite edges, are formed (instead of a single beam originating at one edge) when any one switch is closed. Thus in all cases it is understood that the above-described arrangement is illustrative of one of the many possible specific embodiments which can represent applications of the principles of the invention. Numerous and varied other arrangements can readily be devised in accordance with these principles by those skilled in the art without departing from the spirit and scope of the invention.

What is claimed is:
1. A matrix device comprising:
    a laser including a member of laser material located between a pair of reflective surfaces defining resonant cavity therebetween;
    means for inducing laser action in selected portions of said member comprising:
        a first plurality of pumping sources transversely distributed along one of the surfaces of said member in a first direction parallel to said reflective surfaces;
        and a second plurality of pumping sources transversely distributed along a second adjacent surface of said member in a second direction parallel to said reflective surfaces;
        said first and second pluralities of pumping sources adapted to pump overlapping portions of said material simultaneously;
        and means for selectively energizing each of said pumping sources to a level of pumping power less than that required to induce laser action in said member, but sufficient to induce lasing action in those portions of said member simultaneously pumped by two of said sources.

2. The device according to claim 1 wherein each of said pumping sources extends over the entire length of the surface of said laser material between said reflective surfaces.

3. A laser matrix device comprising:
    a laser member;
    a plurality of pumping sources associated with said laser member wherein each of said sources is capable of providing a directional optical beam passing through the member of intensity insufficient alone to induce lasing in the laser member, but sufficient where superposed on another optical beam from another of said sources to induce lasing in the corresponding portion of the laser member where the said two beams are superposed;

and means for simultaneously energizing selected pairs of said pumping means for causing lasing at selected portions of said laser member.

4. The device according to claim 1 wherein:

said member of laser material is in the form of a rectangular parallelepiped;

said pumping sources are junction diodes;

and said means for selectively energizing each of said pumping sources comprises means for forward biasing each of said diodes.

5. The device according to claim 1 wherein said means for inducing laser action in selected portions of said member comprises:

a uniform source of constant pumping power of intensity less than that required to induce laser action in said member;

a first plurality of injection laser pumping sources transversely distributed along one surface of said member in a first direction parallel to said reflective surfaces; and a second plurality of injection laser pumping sources transversely distributed along a second surface of said member in a second direction parallel to said reflective surfaces;

and wherein said means for selectively energizing each of said pumping sources comprises means for energizing each of said injection lasers to a level of pumping less than that required to induce laser action in said member, but sufficient to induce laser action in those portions of the member which are simultaneously pumped by said source of constant pumping power and two of said injection lasers.

References Cited

UNITED STATES PATENTS 3,123,711   3/1964   Fajans.
3,284,722   11/1966  Gray _____ 331—94.5

JEWELL H. PEDERSEN, *Primary Examiner.*

P. R. MILLER, *Assistant Examiner.*